US012645088B2

(12) United States Patent
Kalis

(10) Patent No.: US 12,645,088 B2
(45) Date of Patent: Jun. 2, 2026

(54) DEVICE FOR SHAPING A LASER RADIATION

(71) Applicant: LIMO DISPLAY GMBH, Dortmund (DE)

(72) Inventor: Henning Kalis, Dortmund (DE)

(73) Assignee: LIMO DISPLAY GMBH, Dortmund (DE)

( * ) Notice: Subject to any disclaimer, the term of this patent is extended or adjusted under 35 U.S.C. 154(b) by 76 days.

(21) Appl. No.: 18/556,315

(22) PCT Filed: Jun. 29, 2022

(86) PCT No.: PCT/EP2022/067875

§ 371 (c)(1),
(2) Date: Oct. 19, 2023

(87) PCT Pub. No.: WO2023/094037

PCT Pub. Date: Jun. 1, 2023

(65) Prior Publication Data

US 2024/0210714 A1     Jun. 27, 2024

(30) Foreign Application Priority Data

Nov. 23, 2021     (DE) ..................... 10 2021 130 604.3

(51) Int. Cl.
*G02B 27/09*          (2006.01)
*G02B 7/18*           (2021.01)

(52) U.S. Cl.
CPC ....... *G02B 27/0927* (2013.01); *G02B 7/1805* (2013.01); *G02B 27/0961* (2013.01); *G02B 27/0966* (2013.01); *G02B 27/0972* (2013.01)

(58) Field of Classification Search
CPC ........... G02B 27/0927; G02B 27/0961; G02B 27/0966; G02B 7/1805
USPC ......................................... 359/831
See application file for complete search history.

(56) References Cited

U.S. PATENT DOCUMENTS

2019/0258067 A1*   8/2019  Suhara ............... B23K 26/0648

FOREIGN PATENT DOCUMENTS

DE       102007026730 A1 * 12/2007   ......... B23K 26/0648
DE       102020114077 A1 * 12/2021   ........... B23K 26/073

* cited by examiner

*Primary Examiner* — Wyatt A Stoffa
*Assistant Examiner* — Mitchell T Oestreich
(74) *Attorney, Agent, or Firm* — IPro, PLLC

(57)          ABSTRACT

Device for shaping a laser radiation, comprising a first homogenizer with a first array of lenses and a second homogenizer with a second array of lenses through which the laser radiation passes through one after the other, a lens device which superimposes the laser radiation passed through the second array of lenses in a working plane, and a first prism and a second prism arranged between the second homogenizer and the lens device, wherein the laser radiation passed through the second array of lenses successively passes through the first and the second prism passes before impinging on the lens means.

14 Claims, 4 Drawing Sheets

0    100    200    300    400    500    600    700

0    100    200    300    400    500    600    700

DEVICE FOR SHAPING A LASER RADIATION

FIELD

The present disclosure relates to a device for shaping laser radiation, in particular for shaping a linear intensity distribution of laser radiation, and a laser device for generating an intensity distribution of laser radiation in a working plane, in particular for generating a linear intensity distribution of laser radiation in a working plane.

BACKGROUND

In known devices for forming a line-shaped intensity distribution of a laser beam, which include two homogenizers with arrays of lenses and a Fourier lens, the length L of the line-shaped intensity distribution results from the following relationship:

$$\frac{p}{f_H} f_F,$$

where p is the pitch of the lenses of the arrays arranged side by side, $f_H$ is the focal length of the lenses of the second array and $f_F$ is the effective focal length of the Fourier lens behind the second homogenizer. These sizes can be freely selected during production, but are then fixed. After production, it is therefore usually no longer possible to influence a line length or a field size of the laser radiation in a working plane.

A device and a laser device of the type mentioned are known from DE 10 2007 026 730 A1. The device described therein comprises a first homogenizer stage with an array of lenses and a second homogenizer stage with two substrates, on each of which an array of lenses is arranged. A lens is also provided, which superimposes the partial radiation emitted from the second homogenizer stage in a working plane, so that a linear intensity distribution of the laser radiation is produced there. In order to be able to adjust the line length of the linear intensity distribution, the two substrates of the second homogenizer stage can be moved relative to one another, so that different distances can be realized in the direction of light propagation.

SUMMARY

The optical effectiveness of the device and the homogeneity of the intensity distribution in the working plane are impaired by the two mutually movable substrates of the second homogenizer stage.

It is provided that the device comprises a first prism and a second prism, which are arranged between the second homogenizer and the lens device, wherein the device is set up so that the laser radiation passed through the second array of lenses successively through the first and passing through the second prism before impinging on the lens device. The insertion of two prisms between the second homogenizer and the lens device has little or no effect on the optical effectiveness of the device and the homogeneity of the intensity distribution generated in the working plane.

In particular, it can be provided that the prisms are set up to at least partially reduce or increase the cross section and/or the divergence of the laser radiation passing through them in a first direction, in particular with the increase in divergence increasing the length of the linear igen intensity distribution and by reducing the divergence a reduction in the length of linear igen intensity distribution is achieved. In particular, the linear intensity distribution extends in the first direction.

The prisms can be set up to change the divergence of the laser radiation passing through them, at least partially in the first direction, by a factor of between 0.5 and 2.0, in particular thereby increasing the length of the linear intensity distribution by a factor of between 0.5 and 2.0 is changed. The prisms can therefore influence the shape of the intensity distribution over a comparatively large area, in particular the length of a laser line generated in the working plane.

It is possible for the lenses of the first array and of the second array to be arranged next to one another, in particular with the direction in which the lenses of the first array and of the second array are arranged next to one another corresponding to the first direction. In this case, the lenses of the first array and of the second array can be cylindrical lenses whose cylinder axes are aligned parallel to one another, in particular with the cylinder axes extending in a second direction that is perpendicular to the first direction. In this way, the lenses can contribute to homogenization in the longitudinal direction of the line. Provision can be made to provide further cylindrical lenses in the Homogenizer for the line transverse direction perpendicular thereto, the cylindrical axes of which extend in the first direction.

It is possible for the first prism to be arranged in the device in such a way that partial radiations of the laser radiation which have passed through lenses of the second array arranged next to one another are not yet overlapping at least in the first direction when they enter the first prism. In this way, the partial beams that have passed through individual lenses can be formed separately from one another by the prisms.

Provision can be made for at least one of the prisms, preferably both prisms, to be movable, preferably pivotable about an axis. The movement, in particular the pivoting, of the at least one prism can change the factor by which the cross section of the laser radiation passing through the prism is changed. In particular, the axis about which at least one of the prisms, preferably both prisms, can be pivoted extends in the second direction. Such a design makes it very easy to influence the field size or the line length of the laser radiation in a working plane.

It is possible for the two prisms to have the same design, in particular to have the same size and/or the same shape. Such a design allows the manufacturing costs of the device to be reduced. It can be provided that the distance between the lenses of the first array and the lenses of the second array corresponds to the focal length of at least some lenses, preferably all lenses, of the second array. Furthermore, the lens device can be positioned in the device in a Fourier arrangement, so that a distribution of the laser radiation in angular space between the second array and the lens device is converted by the lens device into an intensity distribution in spatial space.

It is possible for the laser device to include two laser light sources that are set up to generate laser radiation with properties that differ from one another, for example with divergences or beam profiles that differ from one another, with the laser device being set up so that the laser radiation hits the laser beams adjacent to one another Device impinge and the lens device superimposed both laser beams in the working plane, superimposed in particular in the intensity distribution linear strength. It has proven to be very advantageous that a single lens device in a Fourier arrangement superimposes two possibly very different laser beams in a working plane, in particular in a line-shaped intensity distribution in the working plane, while at the same time the length of the line can be specified by a corresponding position of the prisms.

For this purpose, it can be provided that the device for shaping a laser beam comprises four prisms, two of which are provided for one of the different laser beams. Alternatively, it can be provided that the device for forming a laser radiation comprises two prisms, which are provided for both of the different laser radiation.

BRIEF DESCRIPTION OF FIGURES

FIG. 3b shows a diagram in which the intensity of the laser radiation in the working plane is plotted in arbitrary units against the spatial coordinates in the longitudinal direction of the line of the linear intensity distribution in mm, with the two prisms being in the first position shown in FIG. 3a.

FIG. 4b shows a diagram in which the intensity of the laser radiation in the working plane is plotted in arbitrary units against the spatial coordinates in the longitudinal direction of the line of the linear intensity distribution in mm, with the two prisms being in the second position shown in FIG. 4a;

DETAILED DESCRIPTION

Identical and functionally identical parts are provided with the same reference symbols in the figures. A Cartesian coordinate system is drawn into some of the figures for better orientation.

Figure 1:
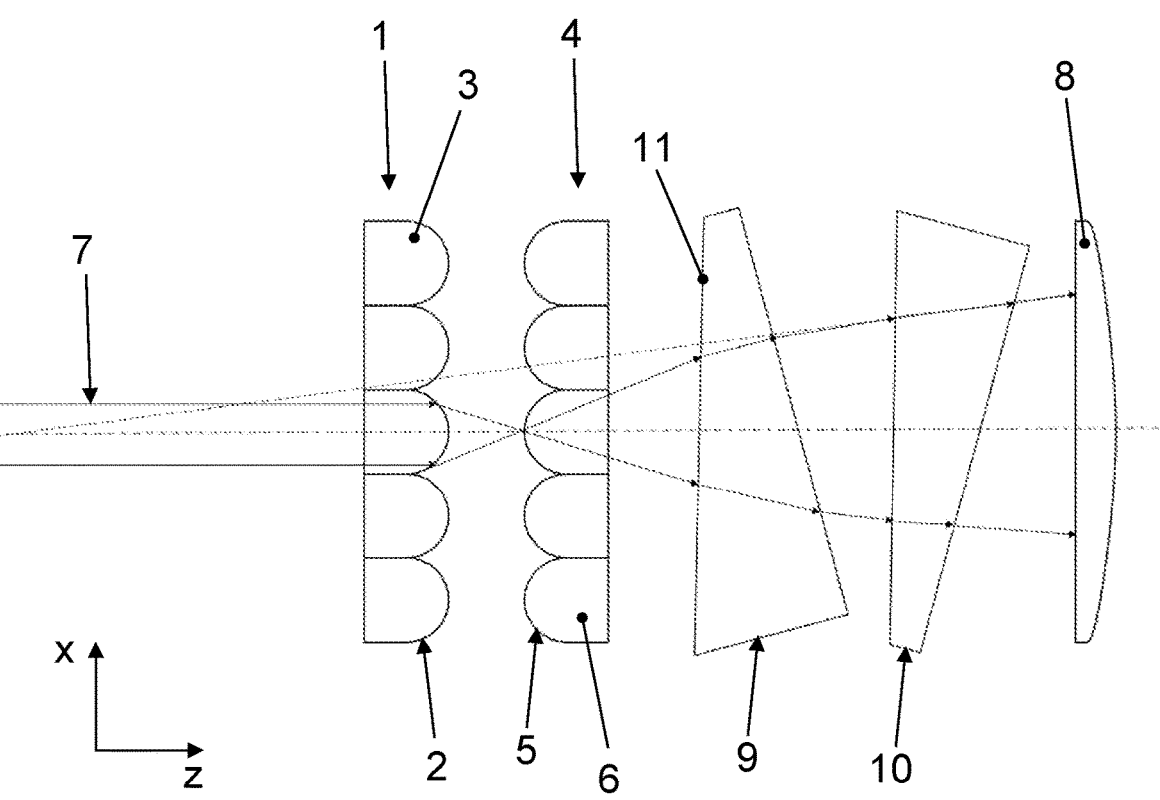
FIG. 1 shows a schematic side view of a first embodiment with drawn-in beams of a laser radiation to be shaped.

The embodiment of the device for shaping laser radiation shown in FIG. 1 comprises, in a manner known per se, a first homogenizer 1 with a first array 2 of lenses 3 and a second homogenizer 4 with a second array 5 of lenses 6. The device is set up so that a laser radiation 7 to be shaped passes through the first array 2 of lenses 3 and the second array 5 of lenses 6 in succession.

The lenses 3, 6 are arranged side by side in a first direction x. The lenses 3, 6 are cylindrical lenses, the cylinder axes of which extend in a direction y perpendicular to the first direction x, the second direction y extending out of the plane of FIG. The lenses 3, 6 therefore act in the first direction x. The laser radiation 7 essentially moves in a third direction z, which is perpendicular to the first and the second direction x, y.

It is entirely possible to provide spherical lenses or differently designed lenses instead of cylindrical lenses, which act both in the first direction x and in the second direction y.

In the figures, the first array 2 is arranged on the exit surface of the first homogenizer 1 and the second array 5 is arranged on the entry surface of the second homogenizer 4. It is certainly possible to arrange both arrays 2, 5 on the entry surfaces or the exit surfaces or to arrange the first array 2 on the entry surface of the first homogenizer 1 and the second array 5 on the exit surface of the second homogenizer 4. Furthermore, it can also be provided that only a single transparent substrate is provided, on the entry surface of which the first array 2 is arranged and on the exit surface of which the second array 5 is arranged.

There is also the possibility that, for example, arrays of lenses that act in the second direction y are arranged on the entry surface of the first homogenizer 1 and/or the exit surface of the second homogenizer 4. For example, these can be cylinder lenses whose cylinder axes extend in the first direction x.

All lenses 6 of the second array 5 have the same focal length. The distance between the two arrays 2, 5 from one another is equal to the focal length of the lenses 6 of the second array 5.

The device shown in FIG. 1 also comprises, in a manner known per se, a lens device 8 which, in the exemplary embodiment shown, is in the form of a plano-convex lens 8 in a Fourier arrangement. The lens device 8 superimposes, in a manner known per se, the partial radiations of the laser radiation 7 emanating from the lenses 6 of the second array 5 in a working plane (not shown) in the first direction x. In this case, a distribution of the laser radiation in angular space is converted into a distribution in local space in the working plane.

It is entirely possible to provide other forms of the lens, such as a biconvex lens. Furthermore, a lens system can also be provided instead of a single lens.

The device shown in FIG. 1 also comprises two prisms 9, 10 between the second homogenizer 4 and the lens arrangement 8, through which the laser radiation 7 passes in succession. In the embodiment shown, the prisms 9, 10 have the same size and the same shape, with the cross section seen in FIG. 1 continuing into the plane of the drawing in FIG.

The first prism 9 on the left in FIG. 1 is arranged in such a way that when the laser radiation 7 impinges on the entry surface 11 of the first prism 9, the partial radiations of the laser radiation 7 that have passed through lenses 6 of the second array 5 arranged next to one another in the first direction x are not yet overlapped with each other.

By suitably aligning the prisms 9, 10, it is possible to change the cross section and/or the divergence of the partial radiations emanating from each of the lenses 6, in particular to change the same for each of the partial radiations. This applies to the changes $$D_{in} \cdot \Phi_{in} = D_{out} \cdot \Phi_{out},$$

where $D_{in}$ is the extent of the partial radiation entering the prisms 9, 10 in the first direction x in spatial space, $\Phi_{in}$ is the extent of the partial radiation entering the prisms 9, 10 in the first direction x in angular space, $D_{out}$ is the extent of the partial radiation exiting from the prisms 9, 10 in the first direction x in spatial space, and $\Phi_{out}$ is the extent of the partial radiation exiting from the prisms 9, 10 in the first direction x in angular space.

Figure 2A:
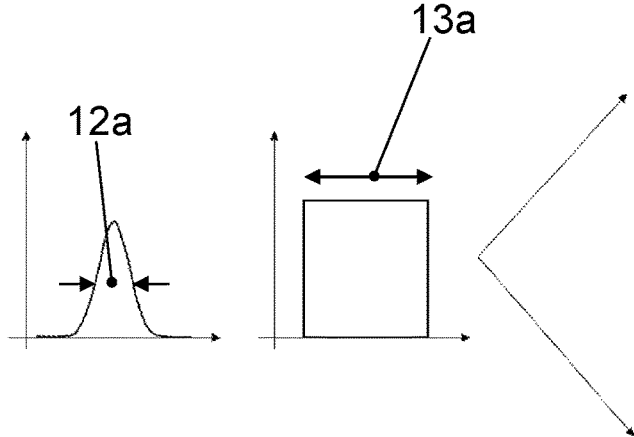
FIG. 2a shows two diagrams which schematically illustrate the distribution of the laser radiation behind the second homogenizer in the spatial space and in the angular space.

FIG. 2a shows the cross-section 12a or the extent $D_{in}$ of the partial radiation entering the prisms 9, 10 in the first direction x in the spatial domain. 2a shows the divergence 13a or the expansion in the partial radiation entering the prisms 9, 10 in the first direction x the angular space ☒ $_{in}$.

Figure 2B:
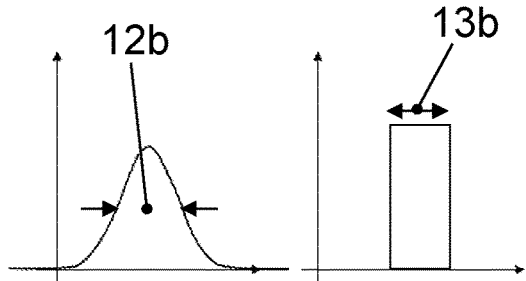
FIG. 2b shows two diagrams which schematically illustrate the distribution of the laser radiation behind the second prism in spatial space and in angular space in a first position of the two prisms.

FIG. 2b and FIG. 2b illustrate the effect of two different positions of the prisms 9, 10 on the partial radiation emerging from the prisms.

FIG. 2b shows the cross section 12b or the extent $D_{out}$ of the partial radiation emerging from the prisms 9, 10 in the first direction x in the spatial domain. 2b shows the divergence 13b or the expansion out of the partial radiation emerging from the prisms 9, 10 in the first direction x in the angular space $\Phi_{out}$. It turns out that the divergence 13b is smaller than the divergence 13a. The smaller divergence 13b or the smaller extent in the angular space is converted by the lens device 8 into a distribution in the spatial space in the working plane, so that a smaller extent of a field in the working plane in the first direction x, in particular a smaller length of the linear intensity distribution results.

Figure 2C:
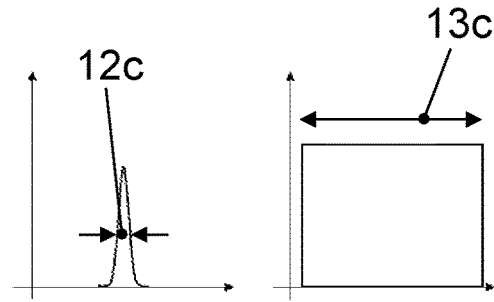
FIG. 2c shows two diagrams which schematically illustrate the distribution of the laser radiation behind the second prism in spatial space and in angular space in a second position of the two prisms.

FIG. 2c shows the cross section 12c or the extent $D_{out}$ of the partial radiation emerging from the prisms 9, 10 in the first direction x in the spatial domain. 2c shows the divergence 13c or the expansion out of the partial radiation emerging from the prisms 9, 10 in the first direction x in the angular space $\Phi_{out}$. It turns out that the divergence 13c is greater than the divergence 13a. The greater divergence 13c or the greater extension in the angular space is converted by the lens device 8 into a distribution in the spatial space in the working plane, so that a greater extension of a field in the working plane in the first direction x, in particular a greater length of the linear intensity distribution results.

This is illustrated in FIGS. 3a to 4b using the specific exemplary embodiment of a device for forming a line-shaped intensity distribution 14 of a laser radiation in a working plane.

Figure 3A:
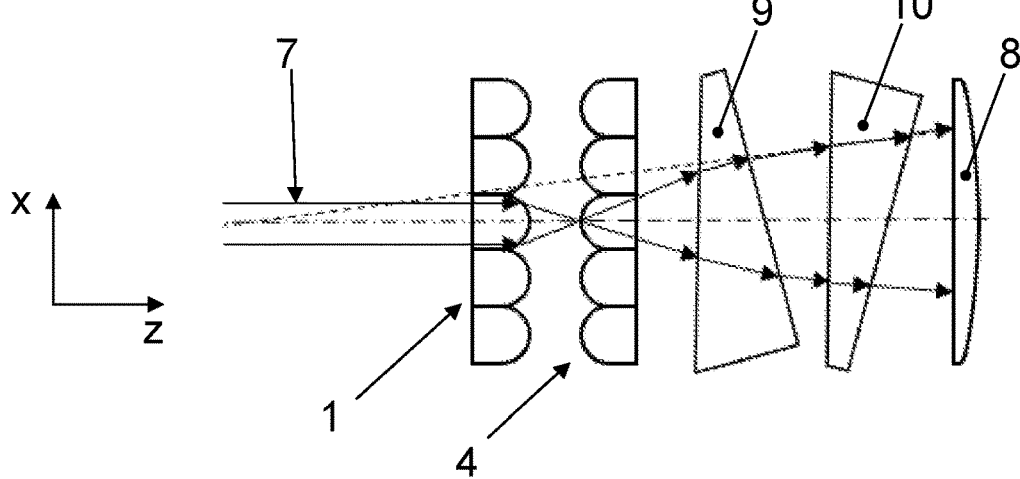
FIG. 3a shows a schematic side view of the embodiment according to FIG. 1 in a first position of the two prisms.
Figure 3B:
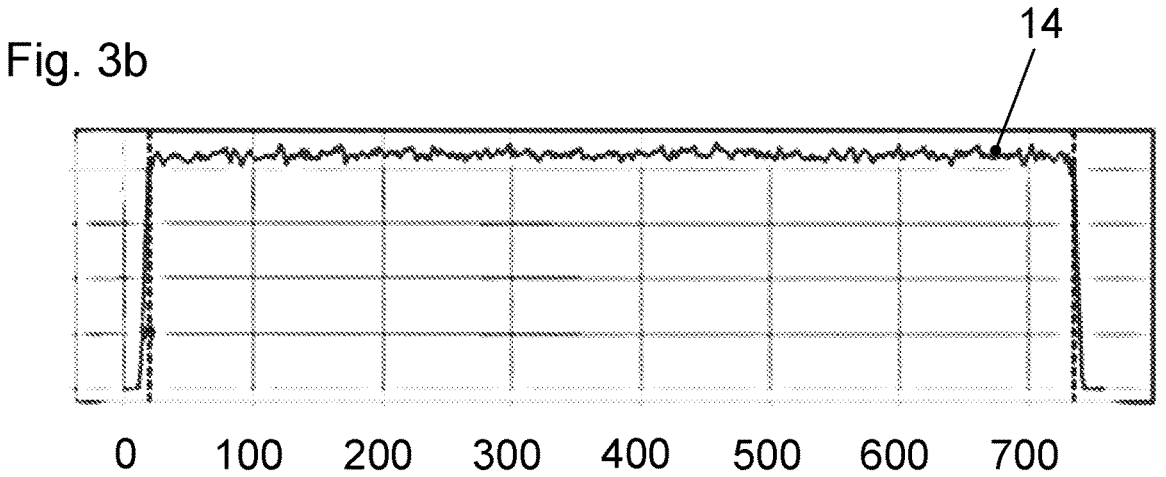

FIG. 3a shows a device in which the prisms 9, 10 are in a first position. In this first position, the length of the linear intensity distribution 14 is somewhat greater than 700 mm, as can be seen from FIG. 3b.

Figure 4A:
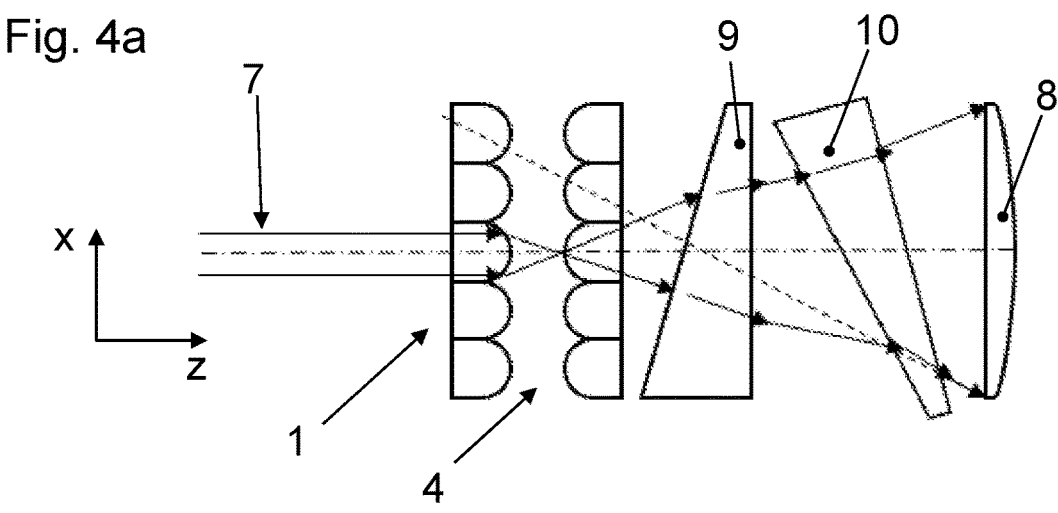
FIG. 4a shows a schematic side view of the embodiment according to FIG. 1 in a second position of the two prisms.
Figure 4B:
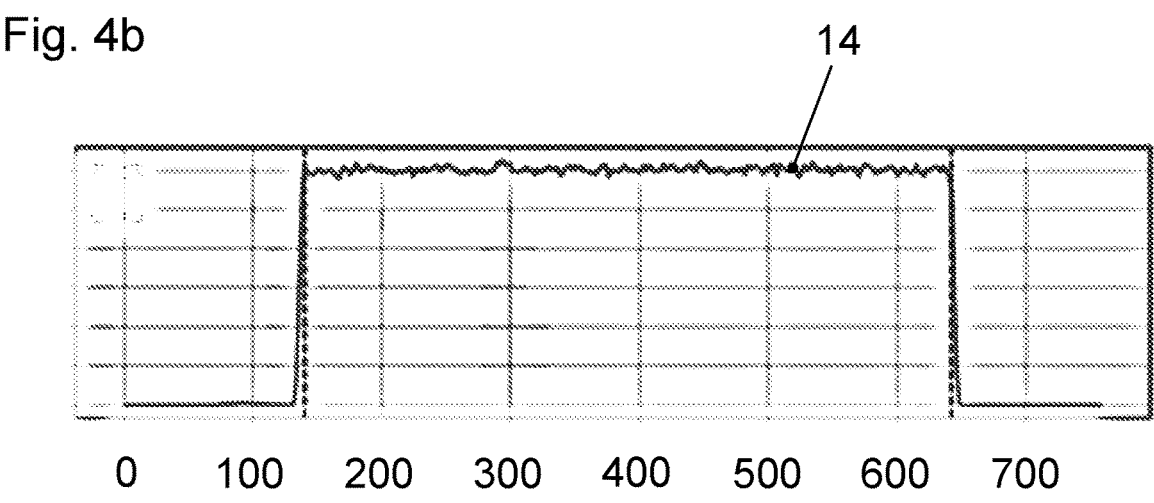

FIG. 4a shows the same device as in FIG. 3a. However, the prisms 9, 10 in FIG. 4a are in a second position, which differs from the first position. In this second position, the length of the linear intensity distribution 14 is approximately 500 mm, as can be seen from FIG. 4b.

The different positions of the prisms 9, 10 can be achieved by pivoting the individual prisms 9, 10 about an axis which extends in the second direction y. In the positions shown in FIGS. 3a and 4, for example, the first prism 9 in FIG. 4a is pivoted clockwise relative to the prism 9 in FIG. 3a about a corresponding axis extending in the second direction y. Furthermore, in the positions shown in FIGS. 3a and 4, the second prism 10 in FIG. 4a is pivoted counterclockwise relative to the prism 9 in FIG. 3a about a corresponding axis extending in the second direction y.

Figure 5:
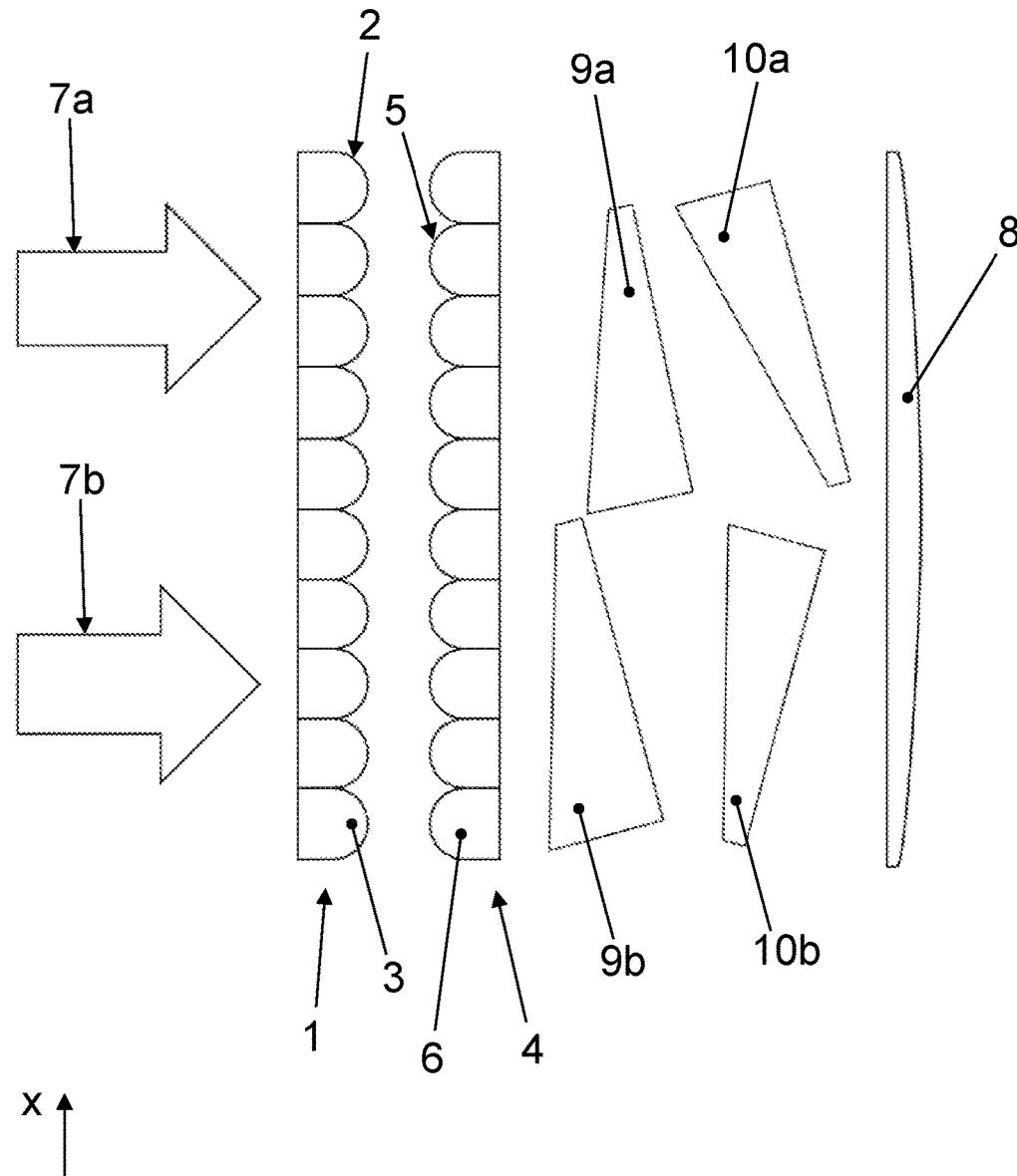
FIG. 5 shows a schematic side view of a second embodiment with drawn-in beams of a laser radiation to be shaped.

FIG. 5 shows an embodiment, which differs from that in FIG. 1 in that instead of two prisms 9, 10, four prisms 9a, 9b, 10a, 10b are provided. In this case, two first prisms 9a, 9b are arranged next to one another in the first direction x. Furthermore, two second prisms 10a, 10b are arranged side by side in the first direction x.

Two laser beams 7a, 7b impinge on the device, which differ from one another, for example, in terms of their divergence or their beam profile. The first laser radiation 7a strikes the upper region of the first homogenizer 1 in FIG. 5, whereas the second laser radiation 7b strikes the lower region of the first homogenizer 1.

The device is set up so that the laser radiation 7a that has passed through the upper first prism 9a in FIG. 5 then passes through the upper second prism 10a in FIG. 5 and that the laser radiation 7b that has passed through the lower first prism 9b in FIG. passes through the lower second prism 10b in FIG. Furthermore, the device is set up so that the two laser beams 7a, 7b passed through the second prisms 10a, 10b pass together through the lens device 8 and are superimposed by it in the working plane, in particular in the linear intensity distribution.

It has proven to be very advantageous that a single lens device 8 in a Fourier arrangement superimposes two possibly very different laser beams 7a, 7b in a working plane, in particular in a linear intensity distribution in the working plane, while at the same time the corresponding positions of the prisms 9a, 9b, 10a, 10b the length of the line can be specified.

Provision can be made for the homogenizers 1, 4 to have differently designed areas for the different laser beams 7a, 7b, which are next to one another or at a distance from one another in the first direction x.

It can also be provided that the device for forming two different laser beams 7a, 7b does not comprise four prisms but only two prisms, not shown, which are provided in this case for both mutually different laser beams 7a, 7b.

There is also the possibility that in the embodiments shown in FIGS. 1, 3a, 4a and 5 further lenses for focusing the laser radiation or the laser radiations in the working plane and/or for shaping the laser radiation or the laser radiations regarding the second direction y are provided. These may not be shown for reasons of clarity.

The invention claimed is:

1. Device, comprising
   a first homogenizer with a first array of lenses,
   a second homogenizer with a second array of lenses,
   a first prism,
   a second prism,
   a lens device,
   wherein a laser radiation incident on the device propagates sequentially through the first array of lenses, the second array of lenses, the first prism, the second prism and the lens device;
   wherein the first prism is configured such that at least a portion of the laser radiation emerging from the second lens array is divergent along at least the first direction (x) as the portion is incident upon the first prism.

2. Device according to claim 1, wherein the first prism and the second prism are configured to reduce a cross section and/or to change a divergence of the laser radiation in a first direction (x).

3. Device according to claim 2, wherein the first prism and the second prism are configured to change the divergence of the laser radiation in the first direction (x) by a factor of between 0.5 and 2.0.

4. Device according to claim 1, wherein lenses of the first array are arranged side by side in the first direction (x), and lenses of the second array are arranged side by side in the first direction (x).

5. Device according to claim 1, wherein lenses of the first array and lenses of the second array are cylindrical lenses whose cylinder axes are parallel to one another and extend in a second direction (y) perpendicular to the first direction (x).

6. Device according to claim 2, wherein the first prism, the second prism or both are movable.

7. Device according to claim 6, wherein movement of the first prism, the second prism, or both, modifies a cross section of the laser radiation propagating through the first prism and the second prism.

8. Device according to claim 6, wherein the first prism, the second prism or both are pivotable about a second direction (y) perpendicular to the first direction (x).

9. Device according to claim 1, wherein the first prism and the second prism have a same shape.

10. Device according to claim 1, wherein the first array and the second array are spaced by a focal length of at least some lenses of the second array.

11. Device according to claim 1, configured to convert an angular intensity distribution of the laser radiation incident on the device into an spatial intensity distribution.

12. A system comprising a first laser light source and the device according to claim 1.

13. The system according to claim 12, further comprising a second laser light source, wherein the first laser light source and the second laser light source are configured to generate laser radiations with different properties.

14. The system according to claim 12, wherein the device comprises a third prism and a fourth prism.

\* \* \* \* \*